US009389073B2

(12) United States Patent
Dumoulin

(10) Patent No.: US 9,389,073 B2
(45) Date of Patent: Jul. 12, 2016

(54) ROTATION LASER HAVING LENS WHICH IS DEFORMABLE IN A TARGETED MANNER BY ACTUATORS

(71) Applicant: Hexagon Technology Center GmbH, Heerbrugg (CH)

(72) Inventor: Charles Leopold Elisabeth Dumoulin, Balgach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 129 days.

(21) Appl. No.: 14/251,329

(22) Filed: Apr. 11, 2014

(65) Prior Publication Data

US 2014/0304994 A1    Oct. 16, 2014

(30) Foreign Application Priority Data

Apr. 12, 2013   (EP) ................................... 13163585

(51) Int. Cl.
*G01C 15/00*   (2006.01)
*G01C 9/02*    (2006.01)
*G02B 26/08*   (2006.01)
*G02B 27/64*   (2006.01)

(52) U.S. Cl.
CPC .............. *G01C 9/02* (2013.01); *G01C 15/004* (2013.01); *G02B 26/0875* (2013.01); *G02B 27/648* (2013.01)

(58) Field of Classification Search
CPC .... G01C 15/004; G01C 9/02; G02B 26/0875; G02B 27/648
USPC .................. 33/228, 290, 281, 282, 285, 286, 33/DIG. 21
See application file for complete search history.

(56) References Cited

U.S. PATENT DOCUMENTS

| 5,239,414 | A | 8/1993 | Reno |
| 5,825,555 | A | 10/1998 | Oono et al. |
| 6,253,457 | B1 | 7/2001 | Ohtomo et al. |
| 7,554,650 | B2 * | 6/2009 | Saito ..................... G01C 15/00 356/3.01 |
| 7,907,499 | B2 * | 3/2011 | Masuda ............... G02B 5/3058 369/112.18 |
| 2002/0027007 | A1 * | 3/2002 | Ohtomo ............... G01C 15/004 172/2 |
| 2010/0295987 | A1 | 11/2010 | Berge | |
| 2012/0127553 | A1 * | 5/2012 | Lukic ................... G01C 15/004 359/238 |

(Continued)

FOREIGN PATENT DOCUMENTS

| CN | 2881544 Y | 3/2007 |
| WO | 2008095923 A1 | 8/2008 |

OTHER PUBLICATIONS

European Search Report dated Jan. 23, 2014 as received in Application No. EP 13 16 3585.

*Primary Examiner* — Yaritza Guadalupe-McCall
(74) *Attorney, Agent, or Firm* — Maschoff Brennan

(57) ABSTRACT

Some embodiments of the invention relate to a rotation laser and a method for operating a rotation laser. The rotation laser may be provided with a laser light source for generating a laser beam, a deflection means rotatable about a rotation axis and serving for the directional emission of the laser beam, and an optical system comprising one or more lenses for manipulating the laser beam. In some embodiments, at least one of the lenses is a lens which is deformable in a targeted manner by actuators. In some embodiments, a control unit is included for manipulating the at least one lens. In some embodiments, the at least one lens has at least four actuators which are drivable by the control unit and/or which are arranged in a manner distributed along a circumference of the lens.

18 Claims, 9 Drawing Sheets

(56) References Cited

U.S. PATENT DOCUMENTS

| | | | |
|---|---|---|---|
| 2013/0201560 A1* | 8/2013 | Dueck | H01S 3/0071 359/569 |
| 2014/0304994 A1* | 10/2014 | Dumoulin | G01C 15/004 33/228 |
| 2014/0307252 A1* | 10/2014 | Hinderling | G01C 15/006 356/141.4 |
| 2015/0042977 A1* | 2/2015 | Siercks | G01C 15/002 356/4.01 |
| 2015/0092183 A1* | 4/2015 | Dumoulin | G01C 15/004 356/4.07 |

* cited by examiner

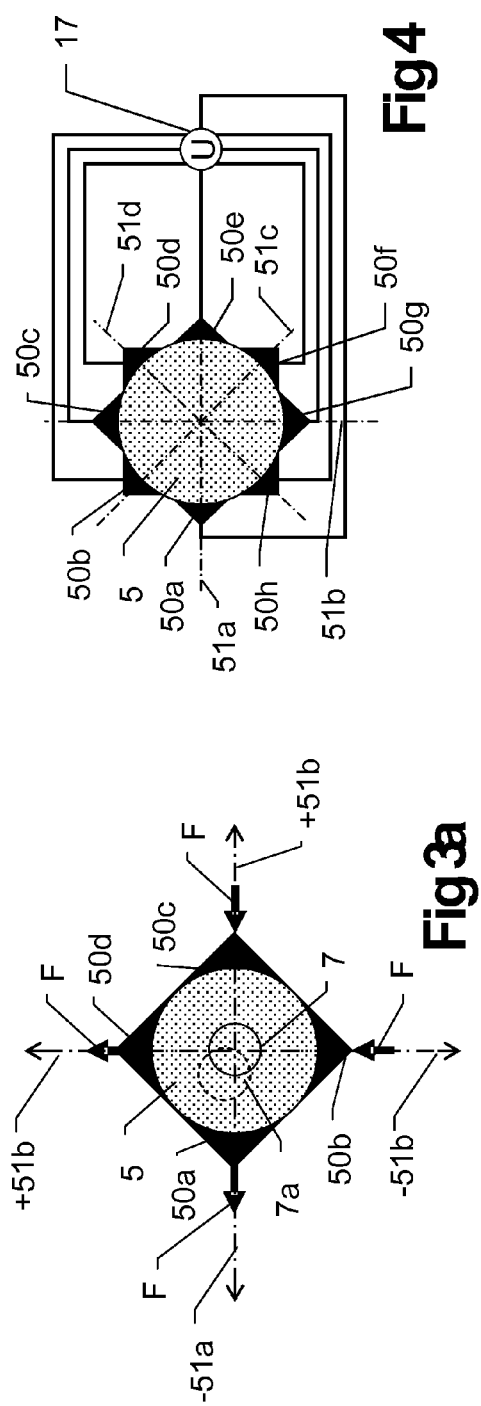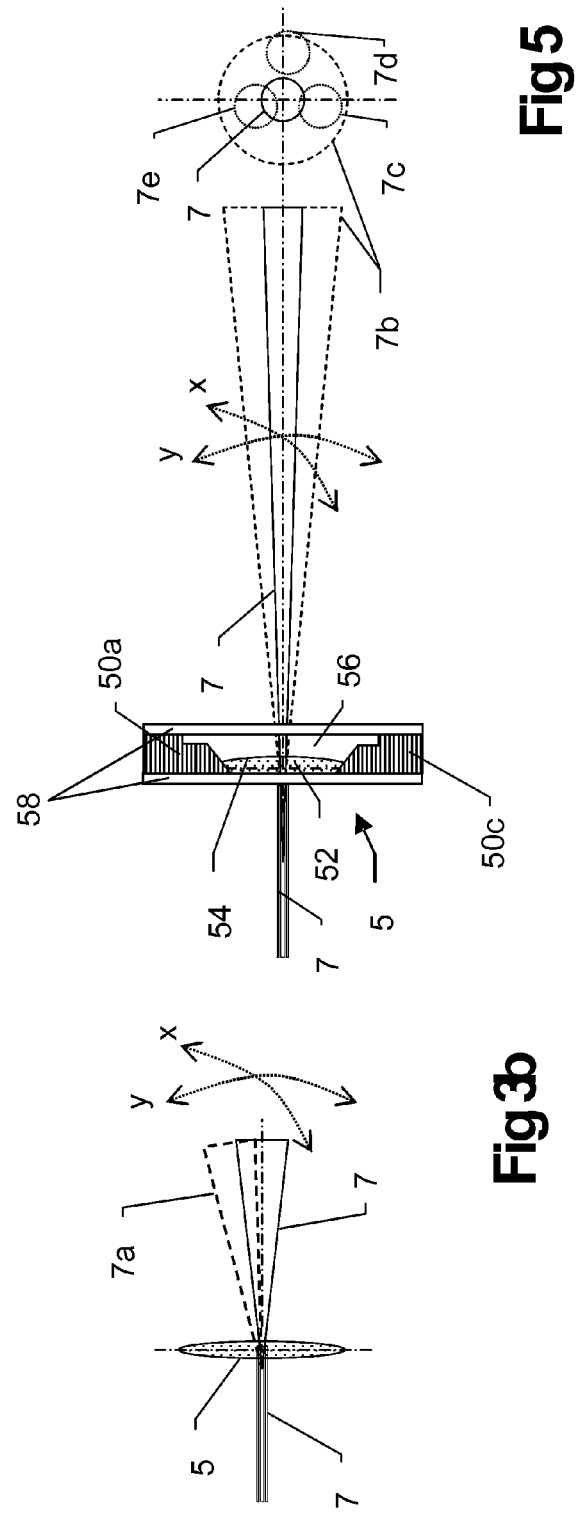

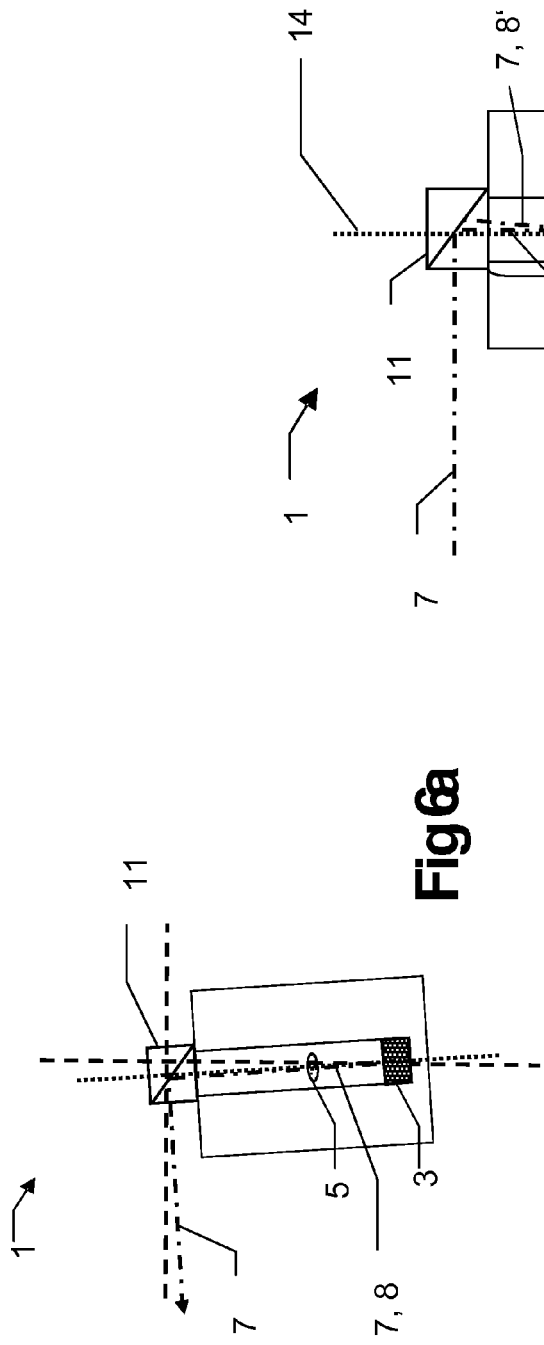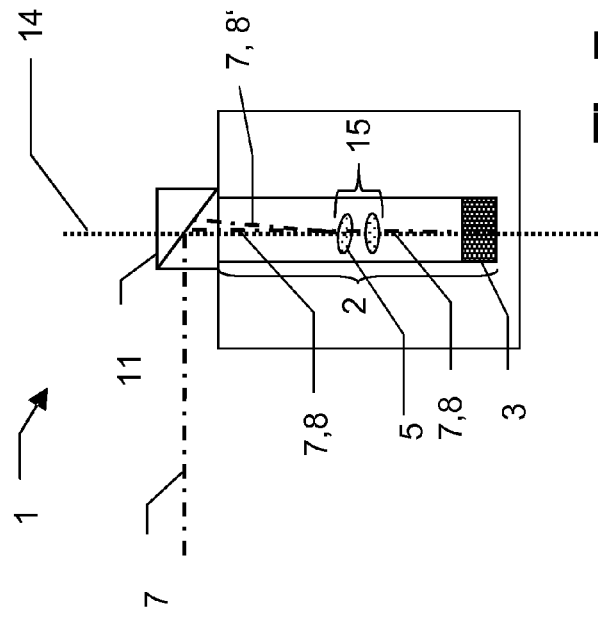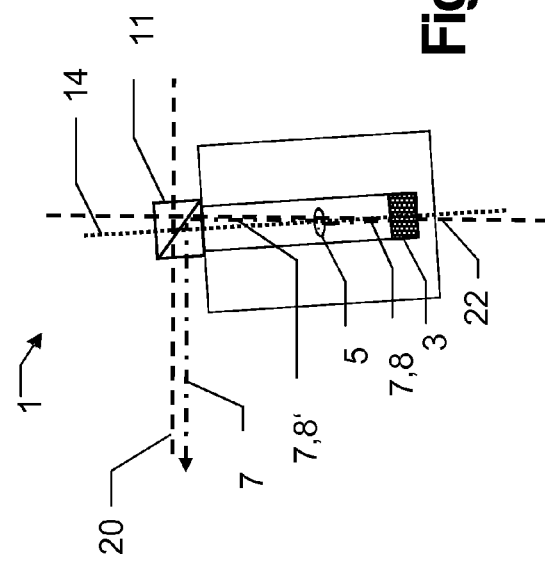

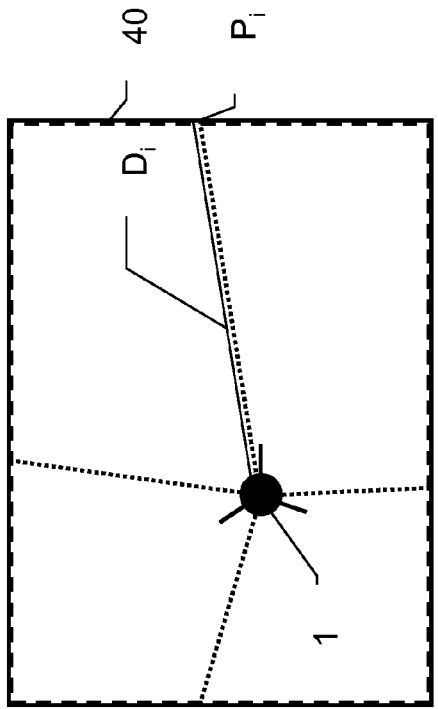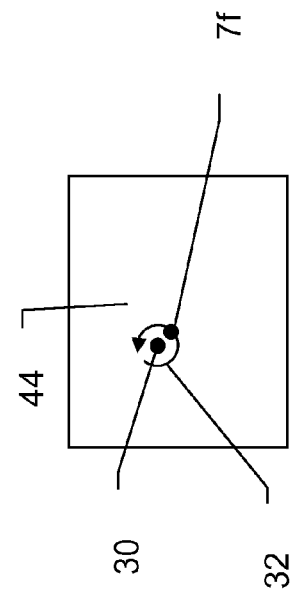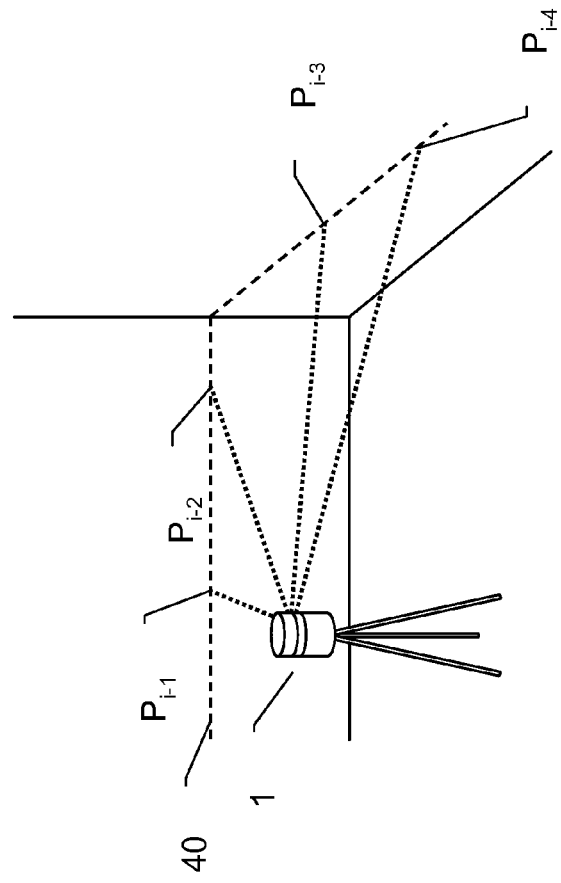

ROTATION LASER HAVING LENS WHICH IS DEFORMABLE IN A TARGETED MANNER BY ACTUATORS

FIELD OF THE INVENTION

The invention relates to a rotation laser, a system and a method.

BACKGROUND

Rotation lasers used for marking points and for defining reference planes on construction sites or reference lines on objects such as e.g. walls, floors or ceilings have been used for many years in the industrial sector and in building and construction. They can be used to project horizontal planes, vertical planes, or else planes inclined in a defined manner, which offer assistance for orientation or positioning on objects.

Rotation lasers generally comprise a transmitting unit comprising a laser light source for generating a laser beam. The rotation laser furthermore has an optical system comprising one or a plurality of lenses, and a deflection means rotatable about a rotation axis and serving for the directional emission of the laser beam. If a rotating laser beam in the visible wavelength range is emitted and if said laser beam impinges on an object, then a reference line is visible there as a basis for further measures. In order that the reference plane or on a wall just the reference line actually has the desired inclination angle in space or is actually horizontal or vertical, firstly the rotation laser must be set up (leveled) perpendicularly in space, and secondly the optical axis of the emitted laser beam, the optical axis of the deflection means (particularly if the deflection means is a pentaprism, as is generally customary) and the mechanical rotation axis of the deflection means must be coaxial with respect to one another. By way of example, if the laser light source (usually a laser diode) is not positioned precisely and has a slant and/or an offset, then the optical axis of the laser beam is not coaxial with the optical axis and the mechanical rotation axis of the deflection means and an orientation error results. If the apparatus is not perpendicular, a leveling error results.

Rotation lasers known from the prior art are usually self-compensating rotation lasers, that is to say that they have means for initial, horizontal or vertical orientation of the laser beam and thus of the laser plane generated by the laser beam. For this purpose, a rotation laser can have an automatic leveling assembly, for example, that is to say that the apparatus upon start-up independently identifies its position relative to the horizontal or vertical plane and compensates for the ascertained deviation of the laser beam from the horizontal and/or vertical plane. The positional deviations of the apparatus can be detected by means of inclination sensors, for example, and the laser beam can then be oriented with the aid of motor-operated or hydraulic inclination compensators. In this case, the laser beam can be oriented for example by the adjustment of the inclination of the apparatus body, that is to say by a tilting mechanism situated in or on the exterior of the apparatus or on an apparatus mount, or by mechanical adjustment of optical components of the transmitting unit. What is disadvantageous is that the motors of the inclination compensators have a high energy consumption and a high inherent weight and, furthermore, require a relatively long time for the orientation of the laser beam. What is furthermore disadvantageous is that the self-leveling is typically possible only for positional deviations of up to approximately +/−5° from the horizontal and/or vertical plane.

The document U.S. Pat. No. 6,253,457 discloses a surveying apparatus, in particular a rotation laser, comprising an optical system comprising a plurality of lenses for correcting the exit angle of a laser beam, wherein the exit angle to be corrected is governed by an inclined position of the surveying apparatus in space. In this case, the exit angle can be corrected for example by the displacement of one or a plurality of lenses along the optical axis of the optical system or by a change in focus of a lens having a variable focus in the optical system. The lenses having a variable focus can be, inter alia, a liquid lens.

Besides the self-leveling of the rotation laser for compensating for positional deviations of the apparatus or, to put it another way, for compensating for angular deviations of the optical axis of the transmitting unit from the horizontal and/or vertical plane, it may additionally be necessary to compensate for further inaccuracies of the apparatus which can be caused, inter alia, by temperature influences or vibrations with respect to a misalignment of one or more components of the transmitting unit, e.g. of the laser light source and/or of one or more lenses of the optical system. In accordance with the prior art, such deviations can be compensated for e.g. by mechanical displacement of one or more lenses of the optical system, as described in U.S. Pat. No. 5,825,555, for example. What is disadvantageous, however, is that such a mechanical displacement of lenses is relatively slow and the weight of the rotation laser is relatively high by virtue of the requisite servomotors. Furthermore, the susceptibility to maintenance increases with the number of movable components in the rotation laser.

SUMMARY

Some embodiments of the invention provide an improved rotation laser which reduces or eliminates the disadvantages mentioned. In particular, some embodiments provide an improved rotation laser which is simpler in its design and therefore simpler and more cost-effective in its production. Moreover, said laser is intended to be easily handleable and thereby user-friendly.

Moreover, additional functions are realized which extend the area of application.

The rotation laser comprises a laser light source, e.g. a laser diode, which is part of a transmitting unit and serves for generating a visible laser beam or a laser beam which is detectable by means of a detector. The rotation laser furthermore comprises a deflection means, e.g. a pentaprism, rotatable about a rotation axis and serving for the directional emission of the laser beam, and an optical system comprising one or a plurality of lenses serving for manipulating the laser beam, wherein at least one of said lenses is a lens which is deformable in a targeted manner by actuators. The term transmitting unit should be understood to mean a mechanical component which extends from the laser light source as far as the deflection means, wherein the laser light source, as mentioned, should be regarded as part of the transmitting unit. The term lens which is deformable in a targeted manner by actuators should be understood to mean an optical element with the optically active lens body exhibiting deformability which is drivable in a targeted manner, wherein the lens which is deformable in a targeted manner by actuators is a polymer lens or a commercially available liquid lens, such as is produced by Varioptic S.A., for example.

According to the invention, the rotation laser comprises a control unit for manipulating the at least one lens which is deformable in a targeted manner by actuators, wherein the at least one lens which is deformable in a targeted manner by actuators has at least three actuators which are arranged in a manner distributed along the circumference of said at least one lens and which are drivable by the control unit in such a way that the laser beam is orientable in a targeted manner in space and/or the divergence of the laser beam is settable.

If the lens which is deformable in a targeted manner by actuators is a liquid lens, then it comprises, for example, an optically transparent chamber with a first and a second optically transparent medium, wherein the first and the second media are immiscible and have different optical refractive indices. The media can be, for example, an aqueous, alcoholic or oily liquid, a polymer in the liquid state, a silicone or silicone oil. Between the first and second media there is an interface, wherein the interface is deformable by the actuators, such that the optical refraction properties of the liquid lens are variable. Alternatively, a thin, transparent membrane can also be present between the two media.

The lens which is deformable in a targeted manner by actuators can also be embodied as a polymer lens, wherein it then comprises in one embodiment an optically transparent container with an optically transparent medium. The container is closed at least on one side with a thin, transparent membrane consisting e.g. of a polymer in an elastically deformable or rubber-elastic state. The membrane comprises a central region constituting the lens body, and a peripheral region having a reservoir with optically transparent medium, wherein the elastic properties of the membrane or the thickness thereof can be different in the different regions. The membrane is manipulatable by the actuators in such a way that the content of the reservoir is displaceable into the lens body and from the lens body into the reservoir. The optical focusing properties of the polymer lens are variable in this way. Instead of being closed by such a membrane only on one side, the container can also have such a membrane on both sides perpendicular to the direction of passage of radiation or be shaped entirely from such a membrane.

A different type of polymer lens is embodied in the form of a polymer membrane, the curvature of which is varied in a manner activated by actuators in order to set the focus. The material of such a polymer lens can be selected from the group e.g. comprising polyethylene glycol dimethacrylate (PEGDM), hydroxyethyl methacrylate (HEMA), copolymer comprising PEGDM and HEMA, hydrogel, silicone, soft silicone, polysiloxane, polyethylene, polypropylene, modified polystyrene or polyurethane.

One particularly suitable form of lens for rubber-elastic material is the meniscus lens, for example. Particularly in meniscus lenses, radial forces bring about a well-controlled change in the two lens radii. Since the material thickness of the lens in all zones or heights of incidence remains unchanged to a first approximation, the radii of curvature assigned to the two surfaces vary differently. It is evident from the lens maker's formula that the refractive power of such an elastic element is also varied as a result. Meniscus lenses additionally have the advantage of a small aperture error, and this is so even in the case of different deformations, since the meniscus shape can be maintained over the entire setting range. The choice and in particular the definition of the Shore hardness of the lens material are largely defined by the lens size and dimensioning. One possible material having low Shore A hardness (DIN 53505) would be a silicone-like casting compound such as Wepesil VT3601E (Shore A hardness: 45), and a material having medium Shore A hardness in the form of a casting resin would be, for example, polyurethane Wepuran VT3404 (Shore A hardness: 50).

In the case of lenses which are deformable in a targeted manner by actuators there is a wide variety of driving and functional principles, for example electrowetting, piezo actuators, magnetic actuators, capacitive actuators, thermal actuators, etc. In this case, the changes in the optical properties of the lens which is deformable in a targeted manner by actuators are brought about either directly or indirectly by electrical drive signals generated by the actuators.

In one preferred embodiment of the invention, one or a plurality of lenses of the optical system are arranged in the transmitting unit between the laser light source and the deflection means.

In a further preferred embodiment of the invention, one or a plurality of lenses of the optical system are arranged such that they concomitantly rotate upon rotation of the deflection means with the latter about the rotation axis. The aperture of the lens which is deformable in a targeted manner by actuators can be kept small in this way. The orientation of the laser beam can be achieved by the driving of one or a plurality of lenses deformable in a targeted manner by actuators. In this case, the required energy and the necessary control signals can be transmitted by means of sliprings, inductive transmission or optically.

In a further preferred embodiment of the invention, one or a plurality of lenses of the optical system are disposed downstream of the deflection means. This arrangement has the advantage that it is possible to use the optical path through the deflection means for generating a desired exit pupil, wherein the path between laser light source and deflection means can be kept small. In addition, the required size of the deflection means and the passage opening of the at least one lens which is deformable in a targeted manner by actuators between the laser light source and the deflection means can be kept small, and the divergence of the output beam can then be varied and set in a desired form by means of the at least one lens which is deformable in a targeted manner by actuators and is disposed downstream of the deflection means.

As is generally conventional, an input unit linked to the control unit is provided, by means of which input unit a user can input or choose parameters or modes of use. The input unit can comprise keys or a touchscreen and can also be operable by means of remote control or in a voice-controlled manner. Moreover, an output unit (display and/or loudspeaker) can be provided for response messages to the user.

In a further preferred embodiment of the invention, the control unit is configured such that, by driving the actuators, the optical refraction properties of the at least one lens which is deformable in a targeted manner by actuators are variable differently in at least two non-coinciding directions. In particular, said directions are at least approximately orthogonal with respect to the optical axis of the lens which is deformable in a targeted manner by actuators. Such lenses which are deformable in a targeted manner by actuators are particularly well suited to influencing the orientation of the laser beam and to imparting to said laser beam the desired direction in space.

Gravitation-free lenses which are deformable in a targeted manner by actuators, e.g. polymer lenses in the form of a polymer membrane, or liquid lenses, such as are used in WO 2008/095923, are advantageously used in the rotation laser according to the invention. This makes it possible to use the rotation laser in a wide variety of deployments and apparatus positions.

In a further preferred embodiment of the invention, the control unit is configured such that, by driving the actuators of the at least one lens which is deformable in a targeted manner by actuators, the laser beam is orientable in the X- and/or Y-direction, wherein the X- and Y-directions are perpendicular to one another are defined in relation to the lens (also cf. FIG. 7, for example).

In a further preferred embodiment of the invention, the control unit is configured such that, by driving the actuators of the at least one lens which is deformable in a targeted manner by actuators, the laser beam can be emitted with an offset in the X- and/or Y-direction. By way of example, by combining two lenses which are deformable in a targeted manner by actuators, it is possible to influence the translation of the laser beam in a targeted manner.

In a further preferred embodiment of the invention, the control unit is configured such that, by driving the actuators of the at least one lens which is deformable in a targeted manner by actuators, the laser beam is manipulatable statically and/or dynamically. A static laser beam manipulation means that the laser beam remains unchanged over a relatively long period of time after a first setting. A dynamic laser beam manipulation should be understood to mean that the orientation and/or the focus of the laser beam are/is regulated or readjusted to predefined desired values constantly continuously or constantly step by step.

In a further preferred embodiment of the invention, the rotation laser comprises a first sensor for detecting angular deviations of the optical axis of the transmitting unit from the horizontal plane and/or vertical plane (inclination error/leveling error). The first sensor can be embodied in the form of an inclination sensor that detects the positional deviations of the apparatus from the horizontal or vertical plane. Suitable inclination sensors are known in the prior art, such as, for example, spirit levels or tilt MEMS. The first sensor is coupled to the control unit, and the control unit is configurable on the basis of the angular deviations detected by the first sensor and forwarded to the control unit such that, by driving the actuators of the at least one lens which is deformable in a targeted manner by actuators, a deviation of the orientation of the laser beam from the horizontal or vertical plane that is caused by the angular deviations of the optical axis of the transmitting unit can be compensated for. As a result, the laser beam can be oriented horizontally and/or vertically, depending on the purpose for which or the apparatus position in which the rotation laser is intended to be used. The compensation with regard to the deviations from the horizontal or vertical plane can be effected by means of the use according to the invention of the at least one lens which is deformable in a targeted manner by actuators, without—for this purpose—the need for the apparatus to be altered (for example tilting) in terms of its position by motor or hydraulically or for optical components to be mechanically adjusted (for example translated).

With at least one lens which is deformable in a targeted manner by actuators, such as is present according to the invention in the rotation laser, the automatic leveling assembly of a self-orienting rotation laser can therefore be simplified. The orientation of the laser beam can be implemented without complex mechanisms and moving parts being used in this case. Rather, the construction of the apparatus is simplified and the number of components required in the rotation laser is reduced, as a result of which a rotation laser is obtained which is lighter, more robust and simpler and more cost-effective in terms of assembly.

In a further preferred embodiment of the invention, the rotation laser comprises a second sensor for detecting angular deviations and/or translational deviations of the axis of the laser beam from the optical axis of the transmitting unit. The second sensor is coupled to the control unit, and the control unit is configurable on the basis of the angular deviations and/or translational deviations detected by the second sensor such that, by driving the actuators of the at least one lens which is deformable in a targeted manner by actuators, the angular deviations and/or translational deviations of the axis of the laser beam from the optical axis of the transmitting unit can be compensated for.

By way of example, if the axis of the laser beam is displaced parallel to the optical axis of the transmitting unit, then a height offset of the emerging laser radiation arises if the deflection means is rotated by 180°. By means of the combination of two spaced-apart lenses which are deformable in a targeted manner by actuators, the laser beam can be deflected to the desired location by the first lens which is deformable in a targeted manner by actuators and the axially parallel orientation can be re-established by the second lens which is deformable in a targeted manner by actuators. A coaxial orientation of the axis of the laser beam and the rotation axis of the deflection means can be obtained as a result. Alternatively, such translational deviations of the axis of the laser beam from the optical axis of the transmitting unit can also be compensated for by only one or by more than two lenses which are deformable in a targeted manner by actuators, depending on the optical possibilities exhibited by the respective lenses which are deformable in a targeted manner by actuators.

The second sensor, for the purpose of detecting angular deviations and/or translational deviations, can comprise a first deflection mirror and a laser detector, for example. The first deflection mirror can either be pivoted into the optical beam path of the laser beam in the transmitting unit for reference measurements or be fixedly installed in the beam path as a semitransparent mirror having a transmission proportion of approximately 80% to 95%. By means of the first deflection mirror, the laser beam generated by the laser light source can be deflected onto the laser detector, which can then determine the deviation of the laser beam from a zero position (the optical axis of the transmitting unit and the axis of the laser beam are congruent in the zero position). Angular deviations of the axis of the laser beam from the optical axis of the transmitting unit can be ascertained in this way. In order, in addition to the angular deviations, also to be able to detect translational deviations of the axis of the laser beam from the optical axis of the transmitting unit and to enable a distinction between angular deviations and translational deviations, the second sensor can, for example, additionally comprise a converging lens between the first deflection mirror and the laser detector. In this case, said converging lens can also be embodied as a lens which is deformable in a targeted manner by actuators.

The angular deviations and/or translational deviations described can arise, for example, as a result of misalignment of components of the optical system or of the laser light source, which can in turn arise e.g. in the course of operation as a result of environmental influences such as temperature or air humidity, impacts or vibrations. According to the invention, an alignment can be effected by the optical assembly being directly adapted by corresponding electrical driving of the at least one lens which is deformable in a targeted manner by actuators and is adjustable differently in a plurality of directions, that is to say without this necessitating mechanical interventions such as the displacement of lenses. Optionally, however, translational deviations of the axis of the laser beam from the optical axis of the transmitting unit can also be compensated for by mechanical means.

In a further embodiment, the compensation of the translational deviations of the axis of the laser beam from the optical axis of the transmitting unit is also implementable in combination with a compensation of the inclination error of the mechanical axis. This necessitates a dynamic deflection of the lenses which are deformable in a targeted manner by actuators, in a manner synchronized with the current position and orientation of the deflection means.

In a further preferred embodiment of the invention, the control unit of the rotation laser is configured such that, by driving the actuators of the at least one lens which is deformable in a targeted manner by actuators, the laser beam is orientable in such a way that an inclined laser plane is producible which is inclined by a defined angle α with respect to the X-axis of the rotation laser and/or by a defined angle β with respect to the Y-axis of the rotation laser. In this case, the X-axis and the Y-axis of the rotation laser are fixedly assigned to the rotation laser, are usually orthogonal with respect to one another, and generally lie in the horizontal plane. The plane thus spanned is specified by the following equation:

$$a \cdot x + b \cdot y + z = 0$$

By means of the use according to the invention of the at least one lens which is deformable in a targeted manner by actuators, therefore, a laser plane inclined in one or in two directions is obtainable, without necessitating adjustment of the apparatus body or of the transmitting unit together with the deflection means.

In order to perform such a function according to the invention for the inclined orientation of the laser plane, the rotation laser can be set, in particular, such that the laser plane is oriented horizontally or vertically before the function is performed. This orientation can be effected, in particular, by means of the at least one lens which is deformable in a targeted manner by actuators, as explained above. Alternatively, the inclination function can also be started immediately, that is to say without preceding initial horizontal or vertical orientation of the laser beam. The angles α and β can be input via an input unit, for example, which is coupled to the control unit of the at least one lens which is deformable in a targeted manner by actuators. If the deflection means is a pentaprism, as is generally conventional in rotation lasers, then, in order to be able to project a static, inclined plane into the space by means of the rotation laser, the actuators of the at least one lens which is deformable in a targeted manner by actuators are driven such that the laser beam assumes a defined angle with respect to the optical axis of the transmitting unit. In this way, it is possible to produce a laser plane with inclination corresponding to the desired inclination value input.

The above-described dynamic driving of the actuators can also be used to project patterns onto an object surface by means of the laser beam, wherein, under certain circumstances, the driving of the actuators is sufficient and the deflection means assumes a fixed position. As a result of a constant readjustment of the orientation of the laser beam by means of the actuators, the reference line generated by the laser beam on the object is finally visible in the form of a pattern, for example a circle.

One possible application of such a laser beam manipulation is, for example, the marking of a reference point on an object, e.g. of a drilled hole. If the drilled hole is marked in a conventional manner, i.e. by a laser beam point, then the latter, as the drill is brought up to the wall, is concealed by the drill and it is no longer possible to accurately determine the location at which the drilling is intended to be effected. With the aid of the dynamic laser beam manipulation explained above, it is possible for the drilled hole, instead of being represented in the form of a point, to be represented as a cutout of a circle having a settable diameter.

However, the pattern of the reference line can also have any other desired, in particular geometrical shape, for example an ellipse or a polygon such as, for example, a triangle, rectangle or square. The dimensions of the projection are distance-dependent. The desired dimensions can therefore be altered by means of a distance measurement automatically or by inputting on the apparatus or by means of remote control.

In a further preferred embodiment of the invention, the control unit is configured such that, by driving the actuators of the at least one lens which is deformable in a targeted manner by actuators, the cross section of the laser beam is variable in terms of its geometrical shape. A round zeroth-order Gaussian laser beam is preferred as laser beam in a rotation laser that is intended to serve for orientation or positioning on objects. In general, a laser beam generated by a commercially available laser diode has an elliptical cross section. With the aid of the at least one lens which is deformable in a targeted manner by actuators, the geometrical shape of the cross section of the laser beam can be changed, either by asymmetrical driving of an individual lens which is deformable in a targeted manner by actuators, or by combination of two lenses which are deformable in a targeted manner by actuators, analogously to the anamorphic prism pair, as disclosed in U.S. Pat. No. 5,239,414.

A further possible application of such a laser beam manipulation, that is to say the variation of the geometrical shape of the cross section of the laser beam, is, for example, the generation of a fanned laser beam, as a result of which a straight line of defined length is projectable on an object. This can be realized very simply by means of at least one lens which is deformable in a targeted manner by actuators and which is disposed downstream of the deflection means and expands the laser beam coming from the deflection means, said laser beam being punctiform in cross section, into a fanned beam. In this case, the fanned beam can be inclined horizontally, vertically and also by a defined angle in a manner deviating from the horizontal or vertical direction.

Furthermore, for the fanned laser beam, on the apparatus, for example in a program memory unit coupled to the control unit, a programmed set of orientations and/or inclinations can be stored, such as e.g. inclinations relative to the horizontal of 0°, 30°, 45°, 60°, 90° and/or locations in space at which the laser beam is intended to appear in fanned-out form. The fanned laser beam is then projected onto the object at the predefined location with the predefined inclination. Orientation should be understood here to mean the orientation in space, i.e. an angle or angular range in the X-Y-coordinate system of the rotation laser under which the fan is projected e.g. onto the surface of an object. The requisite information is obtainable e.g. by means of angle encoders, such as are customary in rotation lasers, in combination with the X-Y-coordinates of the spanned plane of the rotation laser, by means of the surface normal of which the instantaneous azimuth angle and inclination angle of the laser beam can be derived, which yields the instantaneous spatial direction of the laser beam.

Furthermore, the control unit can be configured such that, by driving the actuators of the at least one lens which is deformable in a targeted manner by actuators, the laser beam is convertible into a fanned laser beam having variable orientation and/or inclination, and that this conversion is implementable at one or a plurality of fixed locations of the revolving rotating laser beam. That means that the fanned laser beam is projectable under orientations and/or inclinations that are desired and input by the user, for example, even during rotary operation. By way of example, in revolving operation, by means of a rapidly revolving punctiform laser beam in a space the rotation laser projects a horizontal line onto the surrounding walls. At two locations in the space that are predefined by the user, e.g. where a door is intended to be put in, the beam is expanded by the deformable lens into a fanned beam having an inclination of 90° with respect to the horizontal, such that the position with the door cutout is indicated by two vertical laser lines. In this case, too, the necessary position information is made available by the angle encoders of the rotation laser. Intermittent operation is also conceivable in addition to revolving operation. In this mode, the laser beam rotates as far as the desired azimuth angle, stops there, briefly changes its shape to form a fan, is then switched again as a normal laser beam and then starts moving again. In order to increase visibility, a wide variety of movement sequences are conceivable here, e.g. scanning (see below) or rotating.

In a further preferred embodiment of the invention, the control unit is configured such that, by driving the actuators of the at least one lens which is deformable in a targeted manner by actuators, the laser beam performs a scanning movement. Scanning movement is understood here to mean a back and forth movement of the laser beam in the direction of rotation. In the case of a scanning movement over a small angular range, the rotation laser can be used in point operation since the scanning movement is brought about by corresponding driving of the at least one lens which is deformable in a targeted manner by actuators, without rotation of the deflection means being required.

In a further preferred embodiment of the invention, the rotation laser comprises a control unit configured in such a way that, by driving the actuators of the at least one lens which is deformable in a targeted manner by actuators, a divergence of the laser beam is settable. The user can thus set the focus or the wanted desired diameter of the laser beam by inputting on the apparatus or by means of remote control.

One or a plurality of lenses which are deformable in a targeted manner by actuators is/are used for setting the divergence of the laser beam. In particular, it is possible, with two lenses which are deformable in a targeted manner by actuators, to set the divergence of the laser beam such that the required passage pupils of the lenses become minimal. With the first lens which is deformable in a targeted manner by actuators, for example, a laser beam deviating from the optical axis of the transmitting unit as a result of translation can be deflected in the direction of the optical axis of the transmitting unit. With the second lens which is deformable in a targeted manner by actuators, it is then possible to obtain the coaxial orientation of the axis of the laser beam with the optical axis of the transmitting unit, as described above, and in addition also to set the required divergence or the required focus of the output beam of the rotation laser. Very generally, the divergence of the laser beam can be set in each case very simply by at least one lenses which is deformable in a targeted manner by actuators and is disposed downstream of the deflection means. Preferably, however, the divergence is set by means of a lens which is deformable in a targeted manner by actuators and is disposed directly downstream of the laser diode. This again affords the advantage of reducing the required pupil.

In a further preferred embodiment of the invention, the rotation laser comprises a distance measuring unit for measuring distances to points on an object at which the laser beam is reflected. The distance measuring unit is coupled to the control unit and forwards its measured data to the latter. The control unit is configurable on the basis of the distances measured by the distance measuring unit such that, by driving the actuators of the at least one lens which is deformable in a targeted manner by actuators, a distance-dependent divergence or focus of the laser beam is settable such that a constant desired diameter of a laser beam point generated by the laser beam on the object is obtainable. The at least one lens which is deformable in a targeted manner by actuators, such as is used according to the invention in the rotation laser, therefore enables a distance-adapted focusing of the laser beam. In order to perform such a function according to the invention, in the case of a laser beam moving in space, the distance is constantly measured and the distance-dependent divergence is constantly adapted.

The distance measuring unit can comprise a second deflection mirror and a receiver, for example. By means of the second deflection mirror, which can be embodied analogously to the first deflection mirror described above, a laser beam reflected from an object can be deflected onto the receiver, which can then determine the distance between the rotation laser and the object according to the principle of phase measurement or according to the principle of time-of-flight measurement.

In one particularly advantageous embodiment, the distance measuring unit comprises a parabolic mirror arranged concentrically with respect to the deflection means.

The functionality of the distance-dependent divergence adaptation of the laser beam in the rotation laser according to the invention can be used not only in rotary operation, but also in point operation, that is to say when the laser beam is emitted without rotation, or in a scanning manner in line operation, that is to say when the laser beam is pivoted back and forth at a specific aperture angle.

In a further preferred embodiment of the invention, the control unit is configurable by means of an input unit situated on the rotation laser and/or by means of an external operating unit and/or voice input, in particular by the inputting of a desired value for the orientation of the laser beam and/or the translational offset and/or the geometrical shape of the cross section of the laser beam and/or the inclination of the laser plane generated by the laser beam and/or the diameter of the laser beam point on an object impinged on by the laser beam or for defining a pattern to be projected on an object. The input unit and/or external operating unit and/or voice input are/is coupled to the control unit of the at least one lens which is deformable in a targeted manner by actuators, as a result of which the control unit is configured on the basis of the desired values input and correspondingly drives the at least one lens which is deformable in a targeted manner by actuators.

With the rotation laser according to the invention, the functionalities mentioned above, namely compensating for angular deviations of the optical axis of the transmitting unit from the horizontal plane and/or vertical plane;

compensating for angular deviations and/or translational deviations of the axis of the laser beam from the optical axis of the transmitting unit;

producing a laser plane inclined by a defined angle $\alpha$ at an inclination with respect to the X-axis of the rotation laser and/or by a defined angle $\beta$ at an inclination with respect to the Y-axis of the rotation laser;

setting a divergence of the laser beam;

setting a distance-dependent divergence of the laser beam;

projecting a pattern onto an object surface; and varying the geometrical shape of the cross section of the laser beam, can be performed either individually or in combination with one another.

The present invention furthermore comprises a laser system comprising a rotation laser and a laser receiver, wherein the rotation laser has a data communication receiver and the laser receiver has a data communication transmitter and the rotation laser and the laser receiver are connected to one another via a data communication. The laser receiver additionally has a laser beam detector and an evaluation unit connected to the detector, said evaluation unit being connected to the data communication transmitter. According to the invention, the rotation laser is a rotation laser as explained above. The evaluation unit of the laser receiver is configured in such a way that it ascertains a divergence status of the laser beam on the basis of a reception signal generated on the laser beam detector by the laser beam of the rotation laser and communicates said divergence status to the data communication receiver of the rotation laser by means of the data communication transmitter. The data communication receiver of the rotation laser is coupled to the control unit of the lens which is deformable in a targeted manner by actuators. The control unit is configured in such a way that it compares a desired divergence value/desired diameter with the communicated divergence status (e.g. actual diameter) and, by driving the actuators of the at least one lens which is deformable in a targeted manner by actuators, adapts the divergence or the focus of the laser beam to the desired divergence value/desired diameter.

BRIEF DESCRIPTION OF THE DRAWINGS

The method according to the invention and the rotation laser according to the invention are described in greater detail purely by way of example below on the basis of specific exemplary embodiments illustrated schematically in the drawings. In this case, further advantages of the invention are also discussed. Identical elements in the drawings are identified by identical reference signs. In specific detail:

FIGS. 3a and 3b show an embodiment of a lens which is deformable in a targeted manner by actuators in a rotation laser according to the invention with manipulation of the laser beam in plan view (FIG. 3a) and side view (FIG. 3b);

FIG. 4 shows a further embodiment of a lens which is deformable in a targeted manner by actuators in a rotation laser according to the invention in plan view;

FIG. 5 shows in sectional view from the side a lens which is deformable in a targeted manner by actuators in a rotation laser according to the invention with different embodiments of manipulations of the laser beam;

FIGS. 6a and 6b show a schematic illustration of a static manipulation of the laser beam in a rotation laser according to the invention;

FIG. 7 shows a further schematic illustration of a static manipulation of the laser beam in a rotation laser according to the invention;

FIG. 9 shows one embodiment of a dynamic laser beam manipulation with a rotation laser according to the invention;

FIGS. 10a and 10b show a rotation laser according to the invention with projection of a reference line onto an object in perspective view (FIG. 10a) and in plan view (FIG. 10b);

FIGS. 11a and 11b show a further schematic illustration of a static manipulation of the laser beam in a rotation laser according to the invention;

DETAILED DESCRIPTION

Figure 1:
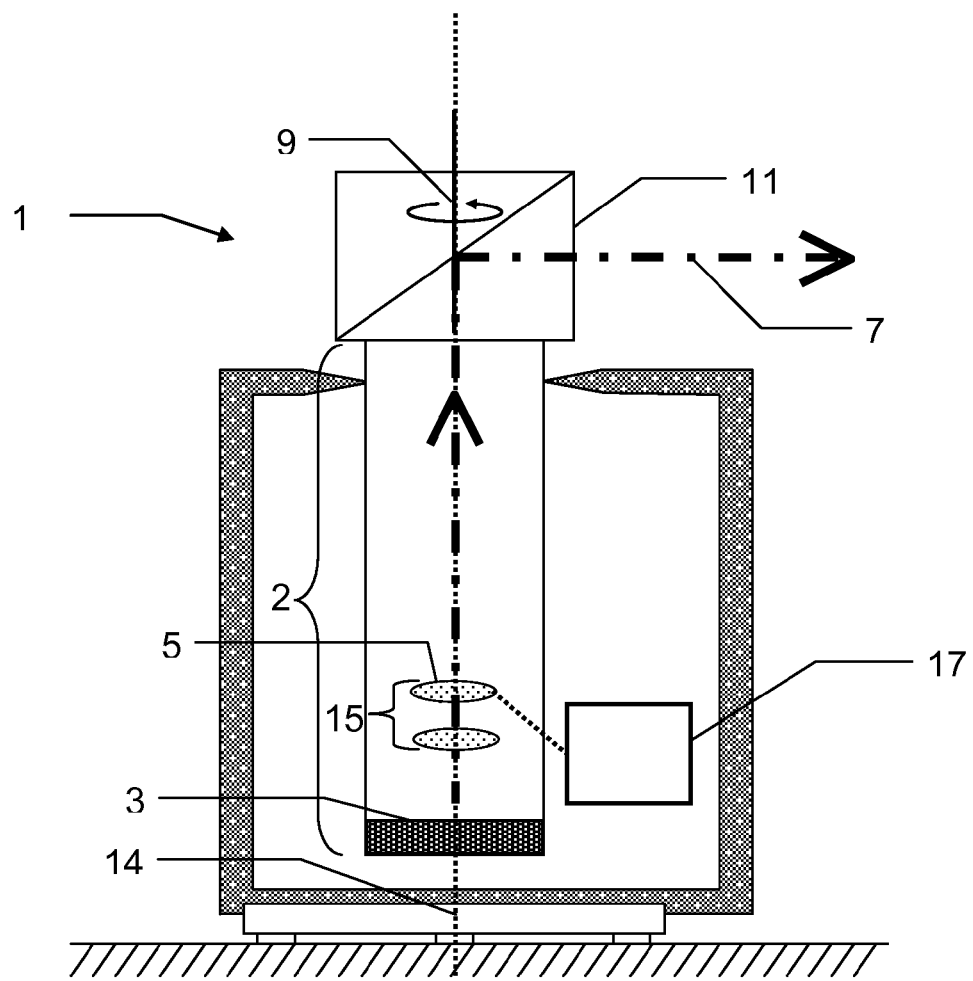
FIG. 1 shows a first embodiment of a rotation laser according to the invention.

FIG. 1 schematically shows one embodiment of a rotation laser 1 according to the present invention in sectional view from the side. The rotation laser 1 comprises a transmitting unit 2 and a deflection means 11. The transmitting unit 2 comprises a laser light source 3, e.g. a laser diode, for generating a laser beam 7. In this example, an optical system 15 comprising one or a plurality of lenses is also arranged in the transmitting unit 2, said lenses being arranged along an optical axis 14 of the transmitting unit, such that ideally an axis of the laser beam 7 emitted by the laser light source 3 is congruent with the optical axis of the transmitting unit 14. The optical system 15 is arranged between the laser light source 3 and the deflection means 11. The deflection means 11 serves for the directional emission of the laser beam 7 and is mounted in a manner rotatable about a rotation axis 9, which is ideally congruent with the optical axis 14 of the transmitting unit and the axis of the laser beam 7. The deflection means 11 typically comprises a pentaprism, which is arranged at the free end of the transmitting unit 2 opposite the laser light source 3 and which deflects the emitted laser beam at an angle of 90°. At least one of the lenses of the optical system 15 is a lens 5 which is deformable in a targeted manner by actuators. In this case, the lens 5 which is deformable in a targeted manner by actuators can either be the sole lens in the optical system or be combined with one or a plurality of rigid lenses. Alternatively or additionally, further lenses which are deformable in a targeted manner by actuators can also be used in the optical system 15. In this case, the lenses can be arranged in any arbitrary order in the optical system 15. Furthermore, the lenses can be arranged between the laser light source 3 and the deflection unit 11 in the transmitting unit 2 (as illustrated in FIG. 1) and/or disposed downstream of the deflection means 11 (not illustrated in FIG. 1). Lenses of the optical system can also be arranged in a manner rotating concomitantly under rotation axis 9 (likewise not illustrated here). The rotation laser 1 furthermore has a control unit 17, which serves for the regulated control of the deflection means 11 and the regulated manipulation of the at least one lens which is deformable in a targeted manner by actuators 5.

Figure 2:
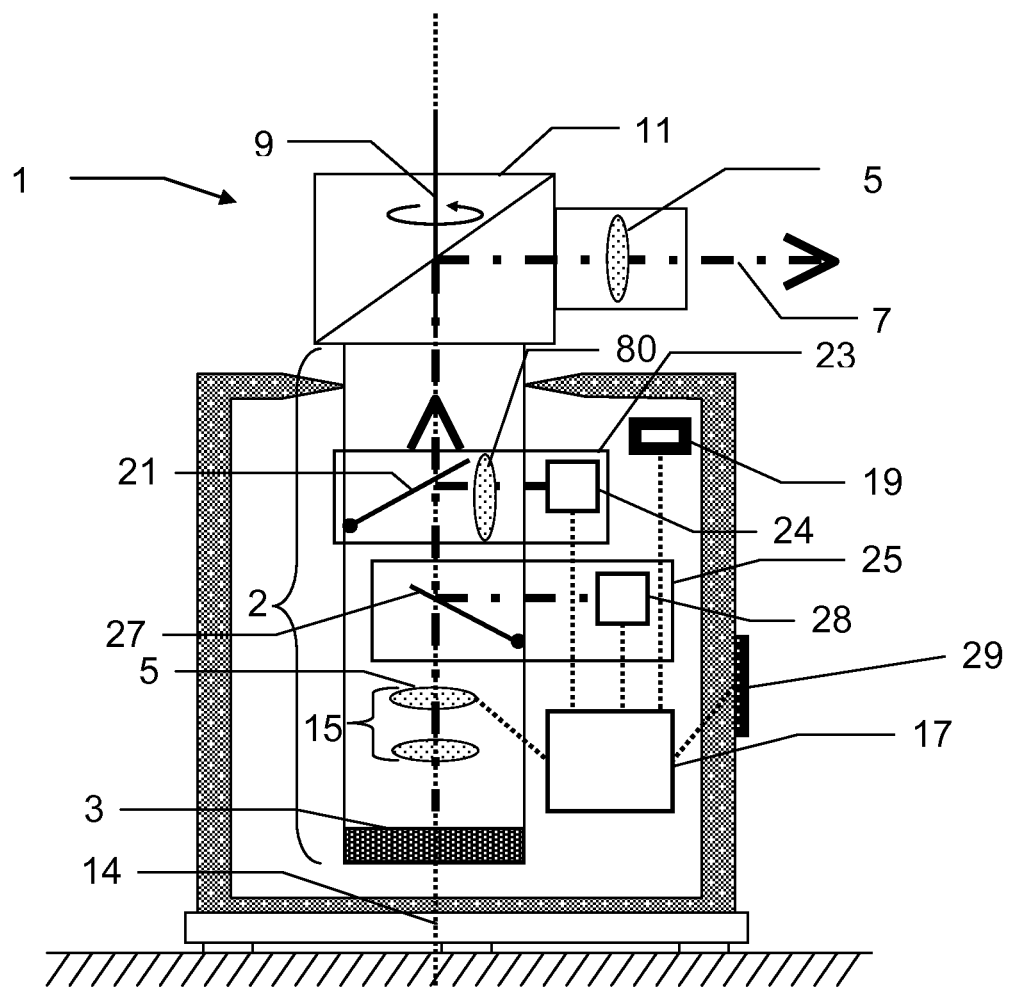
FIG. 2 shows a further embodiment of the rotation laser according to the invention.

FIG. 2 shows a further embodiment of a rotation laser 1 according to the invention. Besides the components shown in FIG. 1, the rotation laser 1 additionally comprises a lens 5 which is deformable in a targeted manner by actuators and which is disposed downstream of the deflection means. The rotation laser 1 additionally comprises a first sensor 19 (inclination sensor, tilt MEMS) for detecting angular deviations of the optical axis of the transmitting unit from the horizontal and/or vertical plane, wherein the first sensor 19 is coupled to the control unit 17 for data transfer (indicated by dotted line).

The rotation laser 1 furthermore comprises a second sensor 23 for detecting angular deviations of the axis of the laser beam from the optical axis of the transmitting unit 14, wherein the second sensor 23 comprises a first deflection mirror 21 and a laser detector 24. In the example shown here, the first deflection mirror 21 is mounted pivottably in the transmitting unit 2 and can be pivoted into the beam path of the laser beam as necessary for deflecting the laser beam 7 onto the laser detector 24. The second sensor 23, in particular the laser detector 24 of the second sensor 23, is coupled to the control unit 17 for data transfer (indicated by dotted line).

The rotation laser 1 additionally comprises a distance measuring unit 25, which comprises a likewise pivotable second deflection mirror 27 and a receiver 28. The second deflection mirror 27 can be pivoted into the beam path of the transmitting unit 2 as necessary, such that the laser beam reflected from an object is diverted onto the receiver 28. The distance measuring unit 25, in particular the receiver 28, is coupled to the control unit 17 (dotted line), such that the distance data respectively measured can be communicated to the control unit.

The rotation laser 1 additionally comprises an input unit 29 for inputting desired values, wherein the input unit 29 is likewise coupled to the control unit 17 for data transfer. On account of the coupling of the control unit 17 to the sensors, it is also possible to switch the sensors to be "active" and "passive". That means e.g. that the second sensor 23 can be switched to be "active" for reference measurements, wherein the pivotable first deflection mirror 21 is then pivoted into the beam path for the reference measurement. After the reference measurement has been carried out, the second sensor 23 is set to be "passive" again and the first deflection mirror 21 is pivoted back into its passive position outside the beam path. The same is analogously possible for the distance measuring unit 25. "Active" and "passive" switching is conceivable for the inclination sensor, too.

Alternatively, the deflection mirrors can be positioned fixedly in the beam path and can be embodied as a semitransparent mirror having a high transmission proportion of approximately 80% to 95%, as a result of which "continuous" reference measurements or distance measurements are possible during operation. In the case of such a configuration of the rotation laser, it is possible, by way of example, to detect and compensate for misalignments during operation directly upon their occurrence. Wherever high precision is required and/or environmental influences make the probability of misalignments of the optical system during operation appear to be probable, or distances are of great interest, this is a very helpful variant of the rotation laser according to the invention.

Since, besides angular deviations, translational deviations of the axis of the laser beam from the optical axis of the transmitting unit 14 can also occur, means are required which allow the type of deviation to be detected in order thus to be able to carry out a suitable compensation. One possibility for detecting this is to equip the second sensor 23 between the first deflection mirror 21 and the laser detector 24 additionally with a converging lens 80, via which the laser beam 7 generated by the laser light source 3 and deflected by means of the first deflection mirror 21 is projected onto the laser detector 24. By means of the impingement position of the laser beam on the laser detector 24, the angular and/or translational deviation of the laser beam from the zero position can then be determined and a corresponding compensation can be carried out. In this case, the converging lens 80 can also be embodied as a lens which is deformable in a targeted manner by actuators. This lens can then be switched as a converging lens (active) or as a plane-parallel plate (passive) by the control unit 17 as necessary.

FIGS. 3a and 3b illustrate one embodiment of a lens 5 which is deformable in a targeted manner by actuators in a rotation laser 1 according to the invention and a manipulation of the laser beam 7. FIG. 3a shows a plan view of the lens 5 which is deformable in a targeted manner by actuators, and FIG. 3b shows a side view. In FIG. 3a, four actuators 50a, 50b, 50c, 50d are symbolized, which are drivable by the control unit 17 and as a result of the driving of which the optical refraction properties of the lens 5 which is deformable in a targeted manner by actuators are variable differently in the directions +51a, −51a, +51b, and −51b. A lens deformable in a targeted manner with three drivable actuators would also be conceivable (not illustrated). The arrows F symbolize a force action on the lens which is deformable in a targeted manner by actuators, thereby bringing about a deformation of the interface between the first and second media of the lens 5 which is deformable in a targeted manner by actuators. In the example shown, the optical refraction properties of the lens 5 which is deformable in a targeted manner are varied as a result of the driving in such a way that the passage direction of the laser beam 7 through the lens which is deformable in a targeted manner is refracted from a central passage (circle with solid line) in the direction of −51a and +51b (circle with dashed line), thereby resulting in a corresponding orientation of the laser steel in space in the −X- and +Y-directions (see FIG. 3b).

FIG. 4 shows a further embodiment of a lens 5 which is deformable in a targeted manner by actuators in plan view, such as is used in the rotation laser according to the invention and which has eight actuators 50a to 50h along its circumference. The four or eight actuators illustrated here in the descriptions of the figures should be regarded in this case as purely by way of example. The number can also be three or assume significantly higher values, depending on the requirements in respect of the fine settability of the lens 5 which is deformable in a targeted manner by actuators. As a result of the driving of the actuators 50a to 50h, the refractive power of the lens which is deformable in a targeted manner by actuators can be varied differently in the different directions ±51a, ±51b, ±51c and ±51d in a controlled manner. The driving is effected by means of the control unit 17, which is illustrated by the connecting lines. In this case, the actuators need not necessarily be distributed uniformly over the circumference of the lens 5 which is deformable in a targeted manner by actuators, as shown here by way of example. However, the driving is somewhat more complicated in the case of a non-uniform distribution. Such a non-uniform distribution of the actuators can be expedient, for example, in the case of a non-gravitation-free lens which is deformable in a targeted manner by actuators, in order to be able to compensate better for gravitation-dictated forces acting non-uniformly on the lens. Another application of this non-uniform actuator arrangement is a targeted translation of the laser beam by the lens which is deformable in a targeted manner by actuators, in order to compensate, for example, for translational deviations between the optical axis of the laser light source and the axis of the transmitting unit and/or the rotation axis of the deflection means 11. Further applications include, for example, the targeted deformation of the lens for generating a dedicated laser fan or for compensating for the elliptical profile of the laser beam 7.

FIG. 5 illustrates a lens 5 which is deformable in a targeted manner by actuators, specifically a liquid lens, in a rotation laser 1 according to the invention with different embodiments of manipulations of the laser beam 7. The liquid lens 5 is constructed in a circular-symmetrical manner and is illustrated here in section in side view. The liquid lens 5 is embodied as a chamber having a transparent housing 58, as is customary in the prior art, and contains a first liquid 52 and a second liquid 56. The two liquids are optically transparent, immiscible and have different optical refractive indices. There is an interface 54 between the first and second liquids, at which interface the laser beam passing through can be manipulated. Alternatively, there can also be a thin, transparent membrane between the two liquids. If both liquids have at least approximately the same specific density, then a very high proportion of gravitational influences on the shape of the interface 54 can be excluded. For the purpose of driving, in this example four actuators are fitted, with the aid of which the geometrical shape of the interface can be varied, only two of said actuators—50a and 50c—being illustrated in the figure.

Firstly, with corresponding driving of the actuators, the refraction properties of the liquid lens 5 can be varied in such a way that the laser beam 7 is deflected in a different spatial direction (indicated by the arrows x and y), e.g. toward 7c, 7d, 7e. By means of corresponding driving, however, with the liquid lens 5 in a rotation laser 1 according to the invention, besides a targeted orientation of the laser beam, it is also possible to implement a focal length change/focus setting, as is illustrated for example by the dashed lines 7b.

FIGS. 6a and 6b show a schematic illustration of a static manipulation of the laser beam 7 in a rotation laser 1 according to the invention, the rotation laser 1 being shown in a greatly simplified embodiment. FIG. 6a illustrates the rotation laser 1 according to the invention with an emitted laser beam 7 before the driving of the lens which is deformable in a targeted manner by actuators. FIG. 6b shows the rotation laser 1 according to the invention with an emitted laser beam 7 in the case of a driven lens 5 which is deformable in a targeted manner by actuators. When the rotation laser 1 is started up, the laser light source 3 generates a laser beam 7 that is emitted via the deflection means 11. As a result of an inclination of the apparatus body of the rotation laser 1, for example owing to an uneven foundation on a construction site, the optical axis of the transmitting unit 14 and thus also the axis 8 of the emitted laser beam 7 are no longer oriented vertically and the laser beam 7 is emitted in a manner deviating from the horizontal plane, as a result of which an undesired, inclined laser plane is projected (cf. FIG. 6a). The angular deviations of the optical axis of the transmitting unit 14 from the horizontal axis 20 and/or the vertical axis 22 are detected, however, by means of the inclination sensor 19, which can be embodied for example in the form of spirit levels or tilt MEMS. The detected angular deviations are then communicated to the control unit 17 and compensated for manipulation of the lens 5 which is deformable in a targeted manner by actuators, as is illustrated in FIG. 6b. For this purpose, the axis of the laser beam 8 is oriented toward 8' and the laser beam 7 is thus emitted horizontally. The required angular correction is therefore firstly determined and then taken into account for the further use of the rotation laser 1 via the lens 5 which is deformable in a targeted manner by actuators, for which reason this is referred to as static manipulation.

FIG. 7 shows a further schematic illustration of a static manipulation of the laser beam 7 in a rotation laser 1 according to the invention. The laser light source 3 generates the laser beam 7 that is emitted along the optical axis of the transmitting unit and is deflected and emitted by the deflection means 11. As a result of an inaccuracy in the optical system 15, for example as a result of misalignment of a lens, which can be the lens 5 which is deformable in a targeted manner by actuators or a rigid lens, the axis of the laser beam deviates from an ideal position 8 to an undesired position 8', which would lead to an erroneous orientation of the emitted laser beam 7. In order to detect and then compensate for such an error in the optical system 15, the laser beam 7 can be intercepted in the beam path of the of the transmitting unit 2 by a first deflection mirror 21, which is pivotable into the beam path, and can be deflected onto a laser detector 24 of a second sensor 23 (see FIG. 2). The internal deflection of the laser beam 7 onto the laser detector 24 for reference purposes can take place in each case before the laser beam 7 is emitted into the surroundings or else only after the laser beam 7 has already been emitted into the surroundings via the deflection means 11. This also takes place repeatedly during operation whenever a reference measurement appears to be necessary. Angular deviations of the axis of the laser beam 8' from the optical axis of the transmitting unit 14 are detected as a result of the laser beam 7 being deflected onto the laser detector 24. The detected angular deviations are then communicated to the control unit 17 of the lens 5 which is deformable in a targeted manner by actuators. The actuators of the lens 5 which is deformable in a targeted manner are driven and manipulated by means of the correspondingly configured control unit 17 in such a way that the laser beam 7 is oriented in the transmitting unit 2 with its axis from the undesired position 8' to the ideal position 8, coaxially with respect to the optical axis of the transmitting unit 14. The laser beam 7 corrected in terms of its orientation can now be emitted without errors.

Not only errors or inaccuracies in the optical system 15 of the rotation laser 1 can be compensated for in the manner described above. It would also be possible, for example, to compensate for temperature-dictated apparatus deviations by means of the corresponding driving of the actuators of the lens 5 which is deformable in a targeted manner by actuators.

Figure 8:
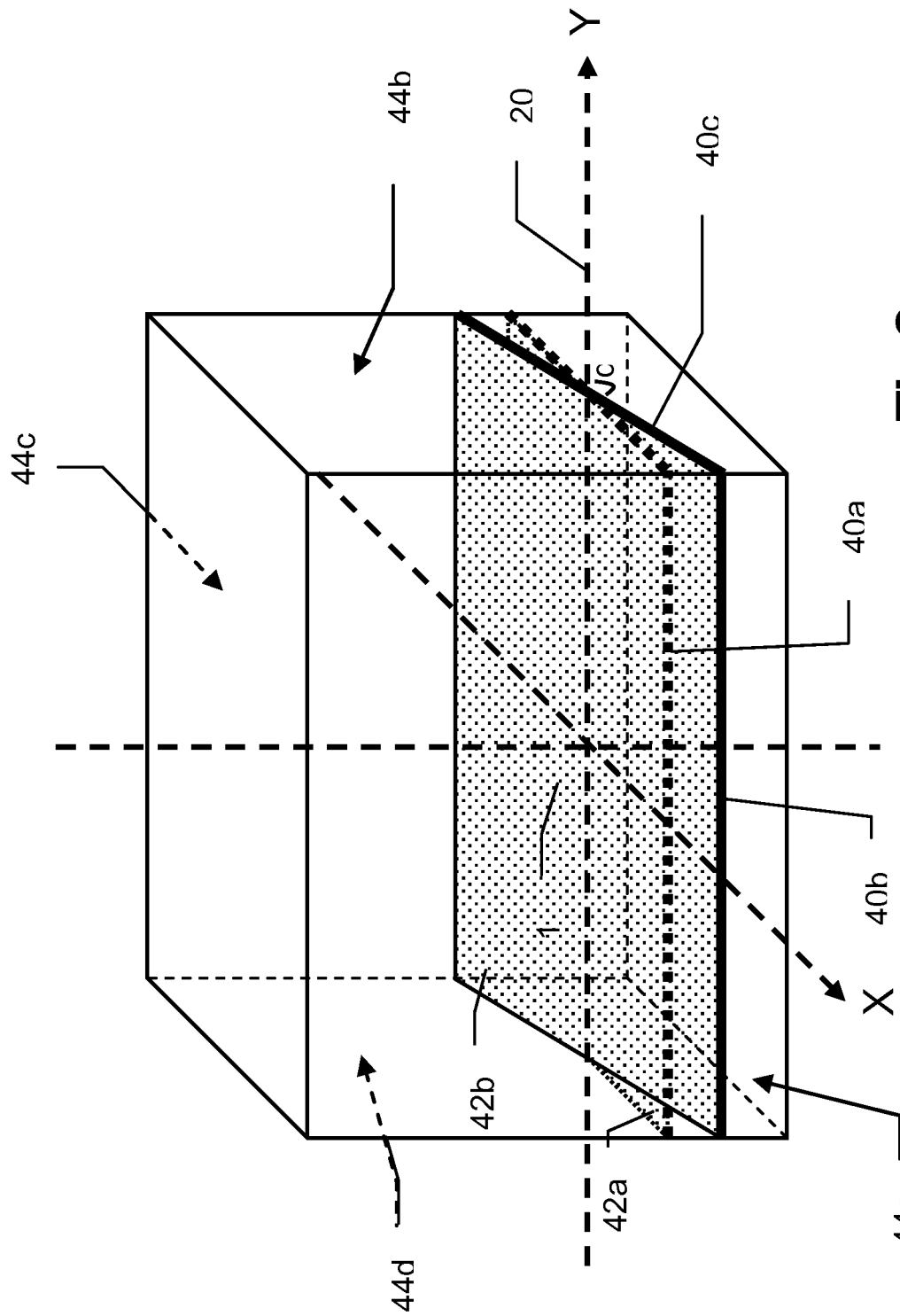
FIG. 8 shows a rotation laser according to the invention with projections of laser planes.
Figure 1B:
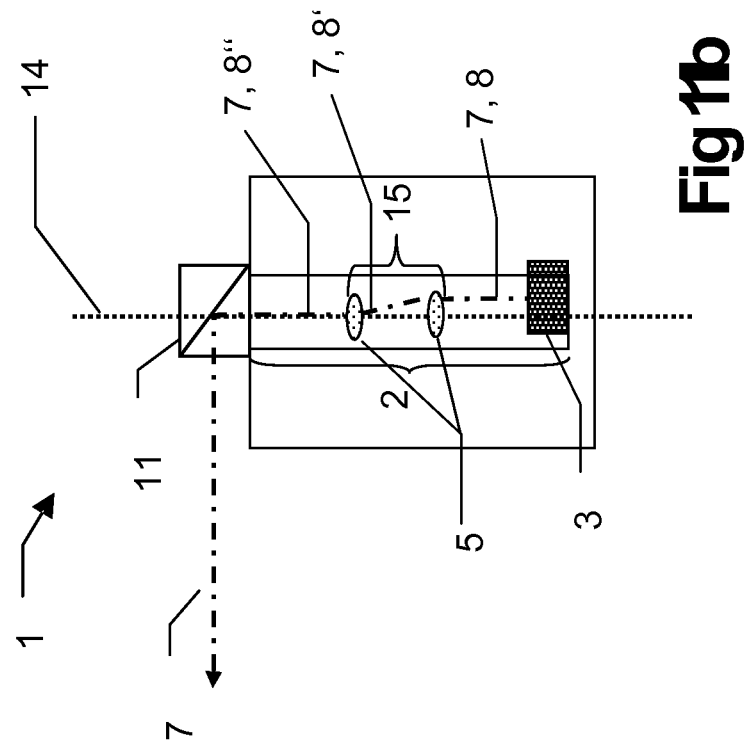
Figure 1A:
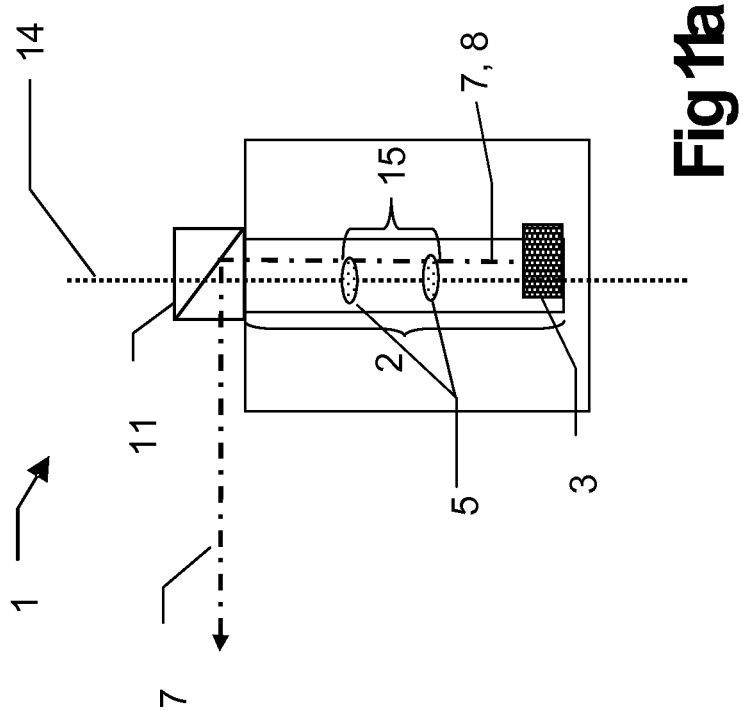

FIG. 8 shows a rotation laser 1 according to the invention, which rotation laser projects a horizontal laser plane 42a that is visible as a horizontal reference line 40a on all side walls 44a-44d of the space illustrated. If the control unit is then configured via the input unit in such a way that an inclined laser plane having an inclination angle α relative to the X-direction of the rotation laser is intended to be produced, the orientation of the laser beam is constantly readjusted using the inclination functionality such that an inclined laser plane 42b is obtained instead of the horizontal plane 42a. By means of the inclined laser plane 42b, horizontal reference lines 40b are produced on the walls 44a and 44c, said reference lines having an offset upward or downward relative to the reference line 40a of the horizontal laser plane 42a, and reference lines 40c inclined by the angle α in the X-direction of the rotation laser relative to the horizontal 20 are correspondingly produced on the lateral side walls 44b and 44d. As mentioned, in order to implement this functionality, it is possible to input a desired inclination value for the laser plane, that is to say a defined inclination angle α relative to the X-axis of the rotation laser and/or a defined inclination angle β relative to the Y-axis of the rotation laser, via an input unit 29, for example, which is coupled to the control unit 17 of the lens 5 which is deformable in a targeted manner by actuators. The inputting can take place before the start of the laser function of the rotation laser 1, for example, wherein the start of the laser function of the rotation laser 1 should not necessarily be equated with the start-up of the rotation laser 1, but rather can also take place only after that. After the desired value has been input into the unit 29, the laser beam 7 generated by the laser light source 3 assumes a defined angle with respect to the optical axis of the transmitting unit 14 as a result of the manipulation of the lens 5 which is deformable in a targeted manner by actuators, such that a laser plane having inclination corresponding to the desired inclination value input is produced.

Instead of beginning directly with the production of an inclined plane, the apparatus can also firstly carry out a self-calibration, wherein the orientation of the laser beam is determined. The determination can be effected by means of the abovementioned sensors, e.g. the first sensor 19 (inclination sensor) and/or the second sensor 23 (sensor for detecting "apparatus-internal" deviations). The driving of the actuators for static laser manipulation, such as are necessary for compensating for inclination errors of the apparatus or errors on account of internal deviations, are finally superposed with the drive signals for producing the inclined plane, as a result of which the inclination of the laser plane corresponding to the desired inclination value is set in a manner free of errors.

The desired value for the orientation of the laser beam can also be input during operation, as a result of which flexible handling of the rotation laser 1 is possible.

FIG. 9 shows one embodiment of a dynamic laser beam manipulation in a rotation laser 1 according to the invention. As a result of the manipulation of the lens 5 which is deformable in a targeted manner by actuators by means of the control unit 17, the laser beam 7 is oriented in such a way that patterns 7f can thereby be generated on a surface. This can take place in coordination with a rotational movement of the deflection means or with a deflection means that is fixed in its position. By way of example, a circular scanning 32 of a reference point 30 on a wall 44 is thus possible. As already explained further above, e.g. drilled holes on objects can be marked in this way.

FIGS. 10a and 10b show in perspective view (FIG. 10a) and in plan view (FIG. 10b) a rotation laser 1 according to the invention, the laser beam of which projects a reference line 40 onto an object, in this example onto the walls of a rectangular space. The rotation laser 1 has a distance measuring unit 25, which comprises a second deflection mirror 27 and a receiver 28 (see FIG. 2) and possibly also a parabolic mirror arranged concentrically with respect to the deflection means 11. However, the distance measuring unit can also be embodied in some other way known in the prior art. During the operation of the rotation laser 1, the distance measuring unit 25 is used to constantly measure the distance to points on the object from which the laser beam is reflected and which are designated for example by $P_{i-1}$, $P_{i-2}$, $P_{i-3}$ and $P_{i-4}$ in FIG. 10a. Through suitable manipulation of the lens 5 which is deformable in a targeted manner by actuators by means of the control unit 17, which is permanently readjusted according to the distance values obtained, a distance-dependent divergence adaptation or focus adaptation of the laser beam is implemented, as a result of which a constant desired diameter of a laser beam point generated by the laser beam on the object is obtained.

In this way, the sharpness and visibility of the reference line 40 on the object can be set in any arbitrary manner. The desired diameter of the laser beam point can be input for example via the input unit 29 or by means of a remote control (not illustrated), which are in each case coupled to the control unit 17 of the lens 5 which is deformable in a targeted manner by actuators. The inputting can take place before the start of the laser function of the rotation laser 1 or during operation. After the desired diameter has been input, the laser beam 7 generated by the laser light source 3 is correspondingly manipulated in terms of focus by means of the lens 5 which is deformable in a targeted manner by actuators, and is emitted via the deflection means 11.

In the rotation laser according to the invention, the distance-dependent divergence adaptation or focus adaptation of the laser beam can be used not only in rotary operation, but also in point operation or in line operation, such as in the case of pipe lasers, for example. In this case, the control unit can also be configured such that it controls the actuators of the at least one lens 5 which is deformable in a targeted manner by actuators independently of a distance measurement such that, solely on the basis of an input by the user, a specific divergence is set or, proceeding from the current divergence, the same is increased or decreased.

FIGS. 11a and 11b show a further schematic illustration of a static manipulation of the laser beam in a rotation laser according to the invention. FIG. 11a illustrates the rotation laser 1 according to the invention with an emitted laser beam 7 before the driving of the lenses 5 which are deformable in a targeted manner by actuators. FIG. 11b shows the rotation laser 1 according to the invention with an emitted laser beam 7 in the case of driven lenses 5 which are deformable in a targeted manner by actuators. The laser light source 3 generates the laser beam 7 that is emitted via the deflection means 11. As a result of an inaccuracy in the apparatus, for example owing to misalignment of the laser light source 3, a translational deviation of the axis of the laser beam from the optical axis of the transmitting unit 14 occurs, i.e. the axis 8 of the emitted laser beam 7 is displaced parallel to the optical axis of the transmitting unit 14 and the laser beam 7 is emitted with an undesired height offset via the deflection means 11 (cf. FIG. 11a). In order to compensate for such an error in the apparatus, the translational deviation can firstly be detected by means of a second sensor (see FIG. 2). The detected translational deviation of the axis of the laser beam from the optical axis of the transmitting unit 14 is then communicated to the control unit 17. By means of the manipulation of a first lens 5 which is deformable in a targeted manner by actuators with the aid of the correspondingly configured control unit 17, firstly the axis of the laser beam 8 is oriented toward 8', as a result of which the laser beam 7 is deflected in the direction of the optical axis of the transmitting unit 14. The laser steel 7 impinges on a further lens 5 which is deformable in a targeted manner by actuators and which, in a manner manipulated by means of the correspondingly configured control unit 17, then orients the axis of the laser beam 8' toward 8", as a result of which the laser beam 7 is oriented coaxially with respect to the optical axis of the transmitting unit 14. The resultant compensation of the translational deviation of the axis of the laser beam from the optical axis of the transmitting unit 14 then enables the laser beam 7 to be emitted correctly without an undesired height offset, as illustrated in FIG. 11b.

If the offset is permanent and if it is ascertained before the delivery of the apparatus, e.g. during final quality control, the magnitude of the offset can be determined and stored as a fixed calibration value in the apparatus. The offset can then always be compensated for by means of the control unit during operation by corresponding driving of the actuators of the at least one lens 5 which is deformable in a targeted manner by actuators, and the measured-value feedback via the sensor 23 and if necessary of the sensor 23 in the apparatus can be obviated.

Figure 12A:
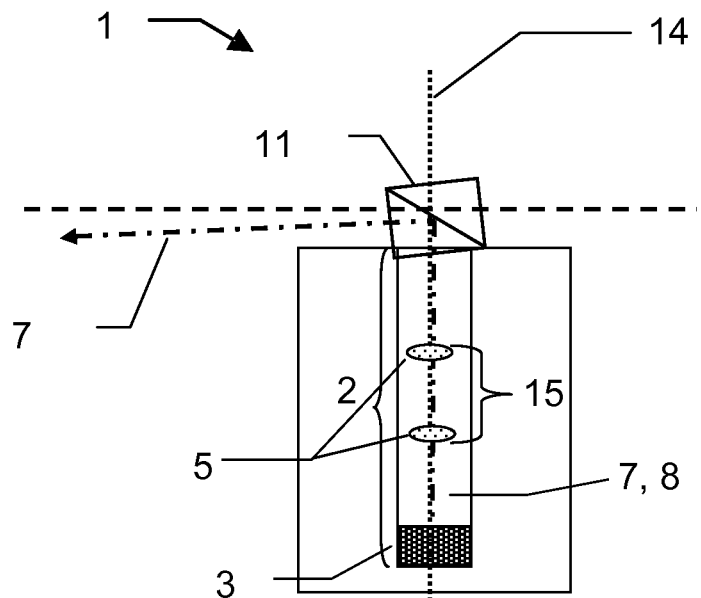
FIGS. 12a and 12b show a further schematic illustration of a static manipulation of the laser beam in a rotation laser according to the invention.
Figure 12B:
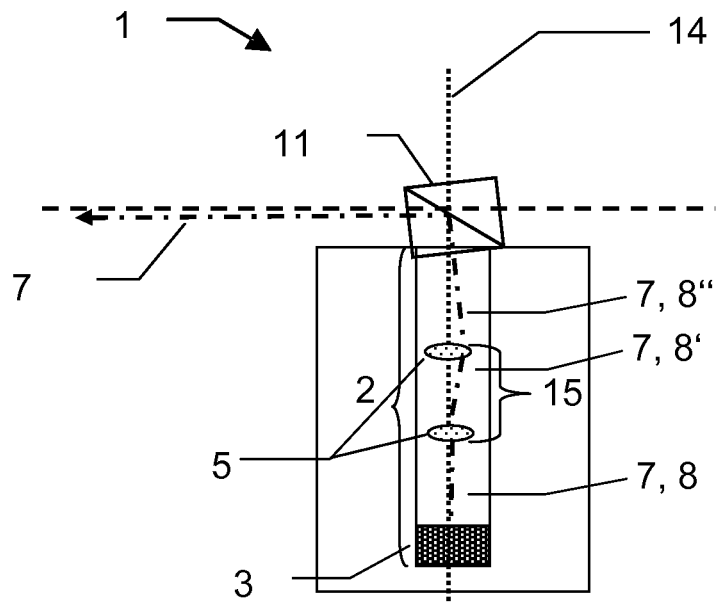

FIGS. 12a and 12b show a further schematic illustration of a static manipulation of the laser beam in a rotation laser according to the invention. FIG. 12a illustrates the rotation laser 1 according to the invention with an emitted laser beam 7 before the driving of the lenses 5 which are deformable in a targeted manner by actuators. FIG. 12b shows the rotation laser 1 according to the invention with an emitted laser beam 7 in the case of driven actuators of the lenses 5 which are deformable in a targeted manner by actuators. The laser light source 3 generates the laser beam 7 that is emitted via the deflection means 11, usually a pentaprism, which is illustrated here in a schematically simplified manner. Since the deflection means always deflects an incoming laser beam by 90 degrees, even if the incident beam impinges on the deflection means or pentaprism obliquely, in the case where the pentaprism or deflection means is slanted, the laser beam is deflected with the correct angle, but with a height offset (FIG. 11b). A height offset likewise occurs if the mechanical rotation axis and the optical axis of the pentaprism do not correspond or if the complete transmitting unit incl. pentaprism is slanted within the housing. If the inclination sensors (sensor spirit levels, tilt MEMS) and the mechanical axis of the transmitting unit are not fixedly connected to one another (at any rate, bearings and suspension of the spirit levels are situated therebetween), this slant cannot be identified and compensated for by means of the automatic leveling assembly and an orientation error likewise results. Furthermore, the laser collimator is connected via a mechanical connection to the deflection means. Even if the spirit levels and the apparatus are measured in a calibration process prior to delivery, if the laser beam lies in the horizontal plane, and an ascertained calibration value is used for constant correction, nevertheless the calibration value can change during operation in a temperature-dictated manner and in an ageing-dictated manner. This change in value likewise leads to a plane error (cf. FIG. 12a).

This plane error has hitherto been corrected by means of a costly calibration process/adjustment process during the service. However, with the aid of the lens 5 which is deformable in a targeted manner by actuators and with the aid of corresponding driving by means of a correspondingly configured control unit, this error can be corrected directly and promptly in the apparatus on site.

In order to compensate for such an error in the apparatus, by way of example, the axis of the laser beam 8 can be oriented toward 8' by means of the manipulation of a first lens 5 which is deformable in a targeted manner by actuators, and the axis of the laser beam 8' can be oriented toward 8" by means of the manipulation of a second lens 5 which is deformable in a targeted manner by actuators. On account of the rotation of the deflection means 11 and a possibly revolving height offset of the incident laser beam, constant readjustment of the orientation of the axis of the laser beam is required, as a result of which the laser beam is transmitted to the deflection means 11 in a type of gyroscopic movement, such that the rotating laser beam 7 is emitted horizontally by the deflection means, as is illustrated in FIG. 12b. The plane error/height offset is therefore corrected highly dynamically and synchronously with the rotating deflection means.

A continuous correction synchronized with the deflection means 11 can also be used to compensate for angular errors/cone errors of the deflection means 11 (cone error correction).

Figure 13:
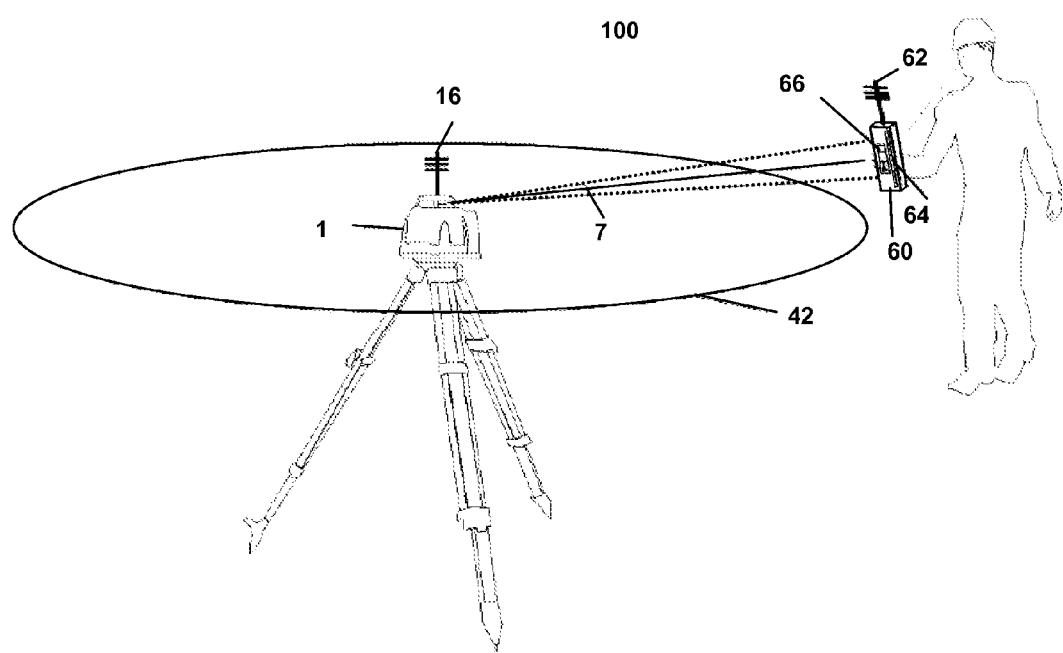
FIG. 13 shows a laser system according to the invention comprising a rotation laser according to the invention and a laser receiver.

FIG. 13 shows a laser system 100 according to the invention comprising a rotation laser 1 according to the invention and a laser receiver 60. By means of rotating emission of the laser beam 7, the rotation laser 1 generates a laser plane 42. The laser receiver 60, here illustrated as a handheld laser receiver, has a laser beam detector 64 for detecting the laser beam 7 emitted by the rotation laser 1. The rotation laser 1 has a data communication receiver 16 and the laser receiver 60 has a data communication transmitter 62, as a result of which, in particular wireless, data communication between the rotation laser 1 and the laser receiver 60 is possible. In order to be able to set the divergence of a laser beam point impinging on the laser beam detector 64 according to a wanted desired divergence value, the laser receiver 60 has an evaluation unit connected to the laser beam detector 64, said evaluation unit additionally being connected to the data communication transmitter 62. The evaluation unit of the laser beam detector 64 is configured in such a way that it can ascertain a divergence status of the laser beam 7 on the basis of a reception signal generated on the laser beam detector 64 by the laser beam 7 and can communicate said status to the data communication transmitter 62. The data communication transmitter 62 in turn then communicates the divergence status to the data communication receiver 16 of the rotation laser 1. The data communication receiver 16 of the rotation laser 1 is coupled to the control unit 17 of the lens 5 which is deformable in a targeted manner by actuators. The control unit 7 is configured in such a way that it compares the wanted desired divergence value with the communicated divergence status and adapts the divergence of the laser beam 7 to the wanted desired divergence value by driving the actuators of the at least one lens 5 which is deformable in a targeted manner by actuators. This process can be repeated as often as until the desired divergence value is set. The divergence can therefore be held at a stable desired value, or be adjusted at any time to said desired value or some other wanted desired value, by automatic readjustment.

In this case, the desired value can be input for example via an input unit 29 coupled to the control unit 17, or by means of a remote control, which in this case can also be integrated in the laser receiver 60. The data transfer from the external operating unit/remote control can be communicated, for example, via radio, or infrared signal. The inputting can be effected by means of mechanical keys, touchscreen or by means of voice input.

The exemplary applications of a laser beam manipulation implemented according to the invention, as described in the figures, can be implemented not only individually but also in combination with one another.

In the explanations given above, various details have been shown and/or described for example individually or in combination with one another. This does not mean, however, that said details can be combined with one another only in the form shown and/or described. The person skilled in the art knows how details of the embodiments of the invention shown and/or described above can be expediently combined with one another, even if not all combinations were able to be presented here for reasons of space.

What is claimed is:

1. A rotation laser comprising:
   a laser light source for generating a laser beam;
   a deflection means rotatable about a rotation axis and serving for the directional emission of the laser beam;
   a transmitting unit extending from the laser light source as far as the deflection means, wherein the laser light source is part of the transmitting unit;
   an optical system comprising one or a plurality of lenses for manipulating the laser beam, wherein at least one lens of the one or a plurality of the lenses is a lens which is deformable in a targeted manner by actuators;
   a control unit for manipulating the at least one lens; and
   at least three actuators which are drivable by the control unit and which are arranged in a manner distributed along a circumference of the at least one lens,
   wherein the control unit is configured such that, by driving the at least three actuators, the optical refraction properties of the at least one lens are variable, such that the laser beam is manipulatable in terms of its orientation and/or its divergence.

2. The rotation laser according to claim 1, wherein one or a plurality of lenses of the optical system
   are arranged in the transmitting unit between the laser light source and the deflection means, and/or
   are arranged in such a way that they concomitantly rotate upon rotation of the deflection means with the latter about the rotation axis, and/or
   are disposed downstream of the deflection means.

3. The rotation laser according to claim 1, wherein the control unit is configured such that, by driving the at least three actuators, the optical refraction properties of the at least one lens are variable differently in at least two non-coinciding directions, or the laser beam is orientable in the x- and/or y-direction of the lens.

4. The rotation laser according to claim 1, wherein the control unit is configured such that, by driving the at least three actuators of the at least one lens, the laser beam can be emitted with an offset in the x- and/or y-direction of the lens.

5. The rotation laser according to claim 1, wherein the control unit is configured such that, by driving the at least three actuators of the at least one lens, the cross section of the laser beam is variable in terms of its geometrical shape.

6. The rotation laser according to claim 1, wherein the control unit is configured such that, by driving the at least three actuators of the at least one lens, the laser beam is manipulatable statically and/or dynamically.

7. The rotation laser according to claim 1, further comprising a first sensor for detecting angular deviations of the optical axis of the transmitting unit from the horizontal plane and/or vertical plane, wherein the first sensor is coupled to the control unit, and the control unit is configurable on the basis of the angular deviations detected by the first sensor such that, by driving the at least three actuators the at least one lens, a deviation of the orientation of the laser beam that is caused by the angular deviations of the optical axis of the transmitting unit is compensated for.

8. The rotation laser according to claim 7, further comprising a second sensor for detecting angular deviations and/or translational deviations of the axis of the laser beam from the optical axis of the transmitting unit, wherein the second sensor is coupled to the control unit, and the control unit is configurable on the basis of the angular deviations and/or translational deviations detected by the second sensor such that, by driving the at least three actuators of the at least one, the angular deviations and/or translational deviations of the axis of the laser beam from the optical axis of the transmitting unit is compensated for.

9. The rotation laser according to claim 1, further comprising a distance measuring unit that measures distances to points on an object at which the laser beam is reflected, wherein the distance measuring unit is coupled to the control unit, and the control unit is configurable on the basis of the distances (Di) measured by the distance measuring unit such that, by driving the at least three actuators of the at least one lens, a distance-dependent divergence of the laser beam is settable such that a constant desired diameter of a laser beam point generated by the laser beam on the object is obtainable.

10. The rotation laser according to claim 1, wherein the control unit is configurable by means of an input unit situated on the rotation laser and/or by means of an external operating unit and/or voice input, by the inputting of a desired value for the orientation of the laser beam and/or the translational offset and/or the geometrical shape of the cross section of the laser beam and/or the inclination of the laser plane generated by the laser beam and/or the diameter of the laser beam point on an object impinged on by the laser beam.

11. A laser system comprising a rotation laser and a laser receiver, wherein the rotation laser has a data communication receiver, and the laser receiver has a data communication transmitter and an evaluation unit connected thereto, and comprising a laser beam detector connected to the evaluation unit, wherein
the rotation laser is a rotation laser according to claim 1,
the evaluation unit of the laser receiver is configured in such a way that it ascertains a divergence status of the laser beam on the basis of a reception signal generated on the laser beam detector by the laser beam of the rotation laser and communicates said divergence status to the data communication receiver of the rotation laser by means of the data communication transmitter,
the data communication receiver of the rotation laser is coupled to the control unit of the lens which is deformable in a targeted manner by actuators, and the control unit is configured in such a way that it compares a desired divergence value with the communicated divergence status and, by driving the at least three actuators of the at least one lens, adapts the divergence of the laser beam to the desired divergence value.

12. A method for manipulating a laser beam implementable by a rotation laser according to claim 1, comprising varying optical refraction properties of the at least one lens by driving the actuators by means of a control unit in such a way that the laser beam is set in terms of its divergence and/or its focus.

13. The method according to claim 12, further comprising:
inputting a desired diameter of a laser beam point generated by the laser beam on an object at which the laser beam is reflected;
generating the laser beam;
emitting the laser beam;
detecting the laser beam reflected from the object and determining the distance (Di) to said object by means of a distance measuring unit; and
setting a distance-dependent divergence of the laser beam by manipulating the at least one lens, wherein the distance-dependent divergence adaptation is constantly readjusted for a laser beam moving in space.

14. A computer program product comprising program code stored on a machine-readable carrier, or a computer data signal, embodied by an electromagnetic wave, for implementing a method according to claim 12.

15. A method for manipulating a laser beam implementable by a rotation laser according to claim 1, comprising varying optical refraction properties of at least one lens by driving the actuators by means of a control unit in such a way that the laser beam is manipulated in terms of its orientation with respect to the x- and/or y-direction and/or is emitted with an offset in the x- and/or y-direction.

16. The method according to claim 15, further comprising:
generating the laser beam;
deflecting the laser beam in the transmitting unit onto a laser detector of a second sensor for detecting angular deviations and/or translational deviations of the axis of the laser beam from the optical axis of the transmitting unit;
compensating for the angular deviations and/or the translational deviations by driving the at least three actuators of the at least one lens as a result of which the laser beam is oriented coaxially with respect to the optical axis of the transmitting unit; and
emitting the laser beam.

17. The method according to claim 15, further comprising:
generating the laser beam;
emitting the laser beam;
detecting angular deviations of the optical axis of the transmitting unit from the horizontal axis and/or vertical axis; and
compensating for the angular deviations by driving the at least three actuators of the at least one lens as a result of which the laser beam is oriented horizontally or vertically.

18. The method according to claim 15, further comprising:
inputting a desired inclination value of a laser plane to be generated by the laser beam;
generating the laser beam; and
driving the at least three actuators of the at least one lens in such a way that the laser beam assumes a defined angle in relation to the optical axis of the transmitting unit, such that a laser plane with inclination corresponding to the desired inclination value input is generated.

* * * * *